(12) United States Patent
McGenity et al.

(10) Patent No.: US 6,495,176 B1
(45) Date of Patent: Dec. 17, 2002

(54) ANIMAL FOOD COMPOSITION

(75) Inventors: Philip Martin McGenity, Holmfirth (GB); Daniel Robert Baker, Warrington (GB)

(73) Assignee: Mars UK Limited, Slough (GB)

( * ) Notice: Subject to any disclaimer, the term of this patent is extended or adjusted under 35 U.S.C. 154(b) by 0 days.

(21) Appl. No.: 09/743,881

(22) PCT Filed: Jul. 16, 1999

(86) PCT No.: PCT/GB99/02303
§ 371 (c)(1),
(2), (4) Date: Mar. 14, 2001

(87) PCT Pub. No.: WO00/03606
PCT Pub. Date: Jan. 27, 2000

(51) Int. Cl.$^7$ .............................. A23L 1/222; A23K 1/18
(52) U.S. Cl. ................ 426/2; 426/49; 426/94; 426/534; 426/638; 426/805
(58) Field of Search ............................ 426/2, 94, 534, 426/805, 49, 638

(56) References Cited

U.S. PATENT DOCUMENTS

| | | | | |
|---|---|---|---|---|
| 5,017,389 A | | 5/1991 | Green | 426/72 |
| 5,405,836 A | | 4/1995 | Richar et al. | 514/23 |
| 5,900,251 A | * | 5/1999 | Raissen | 424/456 |
| 5,922,324 A | * | 7/1999 | Aga et al. | 424/195.1 |
| 5,976,549 A | * | 11/1999 | Lewandoswski | 424/195.1 |
| 5,989,604 A | * | 11/1999 | Wolf et al. | 426/103 |
| 6,117,477 A | * | 9/2000 | Pauluch | 426/623 |
| 6,197,288 B1 | * | 3/2001 | Mankoo | 424/76.1 |
| 6,210,699 B1 | * | 4/2001 | Acharya et al. | 424/435 |
| 6,265,011 B1 | * | 7/2001 | Kelby et al. | 426/549 |
| 6,294,161 B1 | * | 9/2001 | Hiranoto et al. | 424/76.1 |

FOREIGN PATENT DOCUMENTS

| | | |
|---|---|---|
| EP | 0 195 555 B1 | 5/1989 |
| EP | 0 575 021 A2 | 12/1993 |
| GB | 2 106 387 A | 4/1983 |

* cited by examiner

*Primary Examiner*—Chhaya D. Sayala
(74) *Attorney, Agent, or Firm*—Fulbright & Jaworski, L.L.P.

(57) ABSTRACT

A breath-freshening pet food composition comprising at least 40 ppm by weight of one or more plant extract(s), preferably selected from essential oils.

18 Claims, No Drawings

ANIMAL FOOD COMPOSITION

This invention relates to a breath-freshening pet food for a domestic animal, particularly for a dog. In particular, the invention relates to a breath-freshening biscuit.

Halitosis (bad breath or oral malodour) is a common problem among domestic pets such as dogs and cats and constitutes a significant psycho-sociological problem in the animal-owner relationship. Most studies of halitosis, however, have dealt with the problem in humans. Current thinking suggests that the predominant source of bad breath in humans is the mouth. This is supported by experimental findings which show that oral hygiene procedures such as tooth brushing markedly decrease malodour, while conditions such as caries and periodontitis increase the incidence and intensity of oral malodour [G. F. Sulser, R. H. Brenning and L. S. Fosdick, J. Dental Research, 18: 355–359 (1939)].

Although few studies have been published specifically on oral malodour in companion animals, as with humans the root cause in most cases lies in the animal's relatively poor oral hygiene. Very few owners brush their dog's teeth or have them cleaned by a veterinary surgeon on a regular basis.

Oral malodour is produced as a result of microbial metabolism of exogenous and endogenous proteinaceous substrates. No single micro-organism has been indicated as the primary cause. The proteinaceous substrates can be derived from food debris, exfoliated oral epithelium, saliva, blood and gingival crevicular fluid. The proteins obtained from these sources undergo proteolysis to peptides and amino acids which are further metabolised to highly volatile compounds. It is these volatile compounds which are perceived as oral malodour. It has been shown that the predominant unpleasant-smelling components of bad breath are volatile sulphur compounds or VSCs [J. Tonzetich, J. Periodontology, 48: 13–20 (1977)], the most significant being hydrogen sulphide ($H_2S$) and methyl mercaptan ($CH_3SH$).

There is an abundance of remedies for bad breath and improving oral hygiene in humans. U.S. Pat. No. 5,472,684, for example, discloses an anti-bacterial oral composition for counting plaque and gingivitis comprising thymol and eugenol and, optionally, flavouring agents such as Australian Tea Tree Oil. However, many of these types of remedy, such as mouthwashes, sucking mints or chewing gum, or even chewing parsley leaves, are of little value for use with a domestic animal, since they require a significant residence time in the mouth. Clearly domestic pets such as dogs lack the discipline and understanding necessary to make use of these approaches and, as most dog owners will testify, will consume most food offered to them very rapidly.

The addition of breath-freshening active ingredients to pet foods to reduce oral malodour is known. CH-676200 discloses the use of zinc citrate, and other active ingredients such as chlorophyll, for incorporation into hard baked biscuits for dogs and cats. U.S. Pat. No. 5,405,836 discloses the topical application of water soluble zinc salts, such as zinc sulphate, zinc gluconate and zinc chloride, to the surface of a dog biscuit. It is disclosed that topical application of the active ingredient to the biscuit is more effective in relation to incorporation of the active ingredient into the biscuit, i.e. in relation to the addition of the active ingredient before baking. The activity of the zinc salts is attributed to a chemical reaction rather than to anti-bacterial action. The chemical reaction is between the zinc and the VSCs responsible for the oral malodour to form a non-volatile entity. Such biscuits are reported to produce significant reductions in bad breath in dogs.

There is a limit to the amount of the active ingredient that may be added to the pet food. If the active ingredient is added above a certain limit the food becomes unpalatable for the animal. In addition, the use of too great an amount of active ingredient may be harmful to the animal and increases the cost of manufacture. The object of the present invention is to provide an improved breath-freshening pet food which is highly palatable for the animal.

According to the present invention there is provided a breath-freshening pet food composition which contains at least about 40 ppm, preferably 60 ppm, more preferably 80 ppm, more preferably 100 ppm, more preferably 120 ppm, more preferably 160 ppm and more preferably 200 ppm by weight of the composition of one or more plant extracts. It is preferred that the pet food composition comprises no more than about 800 ppm, preferably 650 ppm, more preferably 500 ppm, more preferably 350 ppm, and more preferably 200 ppm by weight of the composition of the plant extract(s). In an embodiment of the invention, the pet food comprises about 200 ppm of one or more plant extracts by weight of the food composition. The food is highly palatable and has the effect of freshening the pet's breath. The food is particularly suitable for consumption by domestic pets, particularly dogs and cats.

According to a further aspect of the invention, there is provided a process for preparing the breath-freshening pet food composition of the present invention. The pet food compositions of the present invention may be made according to conventional methods well-known to those skilled in the art. The compositions may comprise, in addition to the plant extract(s), ingredients and additives substantially similar to those used in conventional pet foods. The plant extract(s) may be added to the pet food composition at any stage of its manufacture. However, if the plant extract(s) are added before the composition undergoes a heating step, an excess amount of plant extract, relative to the amount of plant extract desired in the final composition, should be added in order to take into account the volatility of the plant extract(s).

It is preferred that the pet food of the present invention is a dry or semi-moist pet food, preferably a biscuit. The manufacture of such pet foods and particularly pet biscuits generally involves the step of shaping and baking a dough containing the desired ingredients. The breath-freshening biscuits of the present invention can be made from any suitable dough according to conventional techniques known in the art. The plant extract(s) are generally added to the dough before baking and, accordingly, if the plant extract is volatile the dough should contain a higher concentration of plant extract than is desired in the final biscuit. Typically, the dough should contain the plant extract(s) in an amount which is between 2 and 10 times greater than that required in the final biscuit. The precise amount of plant extract(s) added to the dough will depend, inter alia, on the temperature and duration of heating, on the size of the biscuit and on the volatility of the plant extract(s) used.

In an embodiment of the invention, the term "dry pet food" as used herein is intended to mean a pet food having a water activity $A_w$ of less than 0.65. In this embodiment, the term "semi-moist pet food" as used herein is intended to mean a pet food having a water activity $A_w$ of from about 0.65 to about 0.86. Water activity is a measure of the relative humidity above a sample of the pet food. The relative humidity is measured above a sample in a sealed chamber after being allowed to equilibrate. A device which is suitable for measuring these parameters is the Rotronic Hygroskop DT™. The water activity is on a scale of 0 to 1.0 and is defined as:

water activity $A_w = \frac{1}{100}$ (relative humidity)

The water activity reflects the amount of water which is available to micro-organisms for growth and multiplication. At a water activity of less than 0.65, it is not usually necessary to add preservatives to the pet food. At a water activity of from about 0.65 to about 0.86, it is desirable to add preservatives to the pet food to prevent the growth of mould although the growth of bacteria is minimal under such conditions.

The water content that corresponds to the water activities defined above can vary considerably depending upon a number of factors, such as the presence and levels. of humectants (such as salt, sugar or glycerol etc) in the pet food. Typically, however, a "dry pet food" has a water content of less than about 15% by weight of the final biscuit and a "semi-moist pet food" has a water content of from about 15% to about 25% by weight of the final biscuit. Thus, in an alternative embodiment of the present invention, the term "dry pet food" as used herein means a pet food which has a water content of less than about 15%, preferably less than about 14%, by weight of the final biscuit. In this alternative embodiment, the term "semi-moist pet food" as used herein means a pet food which has a water content of from about 15% to 25%, preferably from about 14% to about 25%, by weight of the final biscuit.

According to a further aspect of the invention there is provided the use of one or more plant extract(s) in the manufacture of a pet food composition for reducing oral malodour in a domestic animal, wherein the plant extract(s) is/are present in an amount of at least 40 ppm by weight.

According to a further aspect of the invention there is provided a method of reducing oral malodour in a domestic animal by the administration to, or consumption by, the animal in need thereof of a pet food composition which contains at least about 40 ppm by weight of the composition of one or more plant extracts.

The term "plant extract" as used herein is intended to mean any substance which is derived, obtained or extracted from a plant or plant part by conventional separation techniques. In a preferred embodiment, the term "plant extract" as used herein is intended to mean any substance which is derived, obtained or extracted from a plant or plant part by conventional separation techniques and which has anti-bacterial activity. In a further preferred embodiment the term "plant extract" is intended to mean a substance selected from essential oil(s), oleoresins, absolutes and fruit juices. In a particularly preferred embodiment, the plant extract(s) are selected from essential oil(s).

An essential oil is the volatile etherial fraction obtained from a plant or plant part by a physical separation method. The physical separation method usually involves either distillation (including water distillation, steam distillation, water and steam distillation and dry distillation) or expression (pressing). Enfleurage, a process in which a floral material is adsorbed onto fat and the essential oil obtained by alcoholic extraction from this fat, may also be used to obtain the essential oil. Generally, essential oils represent the odorous part of the plant material.

Essential oils include angelica root, aniseed, basil, bay, bergamot, bergamot Furocoumarin Free (FCF), cajeput, camphor, cardamom, carrot, cassia, cedarwood (Atlas), cedarwood (Chinese), cedarwood (Texas), cedarwood (Virginia), celery, chamomile, clary sage, clove bud, clove leaf, cinnamon leaf, coriander, cumin, dill, eucalyptus, fennel, frankincense, geranium, ho-wood, lavender, lemongrass, lemon, litsea, marjoram, melissa, myrrh, myrtle, niaouli, neroli, nutmeg, orange (including sweet orange), palmarosa, patchouli, peppermint, petit grain, pimento berry, pine needle, ravensara aromatica, rosewood, rosemary, sage (Dalmatian), tea tree, thyme (including red thyme) and verbena. The preferred essential oils for use in the present invention are eucalyptus, lemongrass, bay, cinnamon, lavender, thyme, clove bud and teatree. Eucalyptus and lemongrass oils are most preferred.

The term "oleoresin", as used herein, is intended to mean the fraction obtained by solvent extraction from spices and herbs. The term "absolute", as used herein, is intended to mean the fraction obtained by extrusion using alcoholic solvent. Absolutes are generally manufactured by alcoholic extrusion from an oleoresin. The term "fruit juice", as used herein, is intended to mean the fraction obtained by expression of the whole fruit or of the flesh of the fruit. (In contrast, an "essential oil" obtained by expression from a fruit is usually obtained by the expression only of that part of the fruit in which the oil is most concentrated, for example in the peel of an orange or lemon).

The plant extracts are either available commercially or may be obtained from the plant or plant part by conventional separation techniques, as described above.

The efficacy of the plant extracts in treating oral malodour is believed to arise from their anti-bacterial activity.

The use of eucalyptus oil in human oral hygiene products, such as mouthwashes, is well known. However, the successful use of these products depends on the presence of the product in the mouth for a certain minimum time period. The use of eucalyptus oil or other plant extract would not be expected to provide a benefit to domestic pets because of the very short time during which the food is present in the animal's mouth prior to swallowing and because of the incorporation of the oil into the food (e.g. a biscuit) as opposed to a liquid format.

The determination of the levels of VSCs provides a quantitative measure of the extent of oral malodour. The breath-freshening effects of the pet foods of the present invention were determined objectively by measuring reductions of the levels of VSCs in the animal's breath at various intervals after consumption. In addition, the anti-bacterial effect of various essential oils was also determined.

The invention will now be described in detail for dog biscuits, but the description applies generally to dry pet foods such as pelletized dog or cat foods, main meals (e.g. extruded pet foods having 6 to 8 percent moisture), etc.

The dog biscuits can be made from conventional dog biscuit doughs. The dough can comprise at least one flour, meal, fat and water. A conventional dough for dog biscuits may also contain discrete particles of meat and/or meat byproducts or farinaceous material. Such doughs typically contain fat solids. Examples of suitable doughs for the production of hard dog biscuits are disclosed in U.S. Pat. Nos. 4,454,163 and 4,743,459, and suitable doughs for the production of soft dog biscuits (containing humectant to control water activity) are disclosed in U.S. Pat. No. 4,454,164. The disclosures of such doughs and the manufacture of pet food disclosed in U.S. Pat. Nos. 4,454,163, 4,454,164 and 4,743,459 are incorporated herein by reference. Particulate proteinaceous particles, such as particles of meat, texturized vegetable protein and/or meat byproducts, can be incorporated to add flavour to the biscuits and texturize the surface. (See U.S. Pat. No. 4,743,459, for example.) Particular farinaceous materials, such as bran particles, can also be employed to texturize the interior and/or surface or the biscuits and to provide other useful properties to the product. A dough found to produce biscuits highly palatable to dogs includes suitable proportions of wheat flour, wheat meal, soybean meal, meat and bone meal, animal fat and natural flavours in admixture with water. The meal used in the doughs suitable for production of biscuits of the invention can comprise meat and/or bone and/or vegetable matter including farinaceous materials, materials prepared from legumes such as beans and peas, tuberous materials such as potato meal, and the like. The meals can be finely or coarsely ground as desired for the texture. Flours made from any suitable farinaceous material can be used.

A suitable dough contains farinaceous material, an edible oil, an antioxidant, an antimycotic, salt, animal fat added vitamins and minerals, such as those disclosed in U.S. Pat. No. 4,229,485, column 5, lines 7 to 57, which is incorporated herein by reference. The compositions of the invention may also contain at least one animal-derived proteinaceous meal such as meat meal, bone meal or fish meal. A good biscuit dough for producing the biscuits of the invention contains about 50 to 60 percent by weight of wheat flour, about 5 to 10 percent by weight of soybean meal, about 3 to 10 percent by Weight of meat and bone meal, about 1 to 5 percent of wheat meal, about 1 to 5 percent of animal fat preserved with BHA, about 20 to 30 percent by weight of water, about 2 to 5 percent by weight of natural flavours, vitamin and mineral preblend, and acidulant The dough ingredients are generally admixed at a temperature of about 5° to about 60° C., preferably about 15° C. to about 30° C.

The dog biscuit doughs can contain a softening agent or humectant. The preferred humectant is propylene glycol. Examples of other humectants which can be used are corn syrup, sugar and polyalcohols, such as sorbitol and glycerin.

The dough can also contain edible surfactants or emulsifying agents, e.g. cationic agents and nonionic agents. Exemplary nonionic emulsifying agents can be broadly defined as compounds produced by the condensation of alkylene oxide groups (hydrophilic in nature) with an organic hydrophobic compound which can be aliphatic, alkyl aromatic, or a condensate of an alkylene oxide with an alkylene glycol (hydrophilic in nature). Examples of nonionic emulsifying agents which can be used include polyethylene oxide condensates of alkyl phenols, products derived from the condensation of ethylene oxide with the reaction product of propylene oxide and ethylene diamine, ethylene oxide condensates of aliphatic alcohols, long chain tertiary amine oxides, long chain tertiary phosphine oxides, long chain dialkyl sulfoxides and mixture of such materials. The emulsifier is generally used in minor amounts.

The dog biscuit dough can be mixed using conventional equipment. For example, the mixing can be at 20 to 100 rpm. For example, a dry blending step can be done at room temperature for a period of time of about 3 minutes to about 20 minutes. The dry-blended mixture can then be mixed with water to form a first stage dough. The water which can be admixed with the dryblended mixture is typically at a temperature of about 20° C. to about 65° C. The water can be added, with mixing, over a period of time of about 3 minutes to about 6 minutes to form the first stage dough. Then, the fat portion of the biscuit dough can be admixed with the first stage dough to form the final stage dough. The fat portion can be added at a temperature at which it is at least fluid, typically at about 35° C. to about 65° C. The fat portion can be mixed for a period of time which is sufficient to form a dough whose homogeneity is visually apparent. A typical final mixing time is about 3 to about 5 minutes.

Formation of the dough is achieved at about atmospheric pressure with the mixing of the components being conveniently achieved in an upright sigma blade mixer or other bakery-type mixers. The various ingredients can be added over a period of time or in a one-shot process according to the above order of addition. However, melted fat and water can be added simultaneously and mixed for about 6 to 10 minutes.

The dog biscuits are formed in any conventional or suitable manner, such as by extrusion, stamping, cutting or molding. Any suitable dog biscuit shape, such as a bone-shaped biscuit, can be used. For many products, such as the bone-shaped canine biscuits of the invention, a rotary molding system is preferred because it permits the rapid forming of dough pieces with good control over their shape, form and surface characteristics. Docker holes are optionally formed in the dough piece during molding to facilitate the escape of moisture during baking, cooking and/or drying.

The dough is formed into pieces by machining on a rotary molder with specific die shapes. The dough can also be formed into pieces by sheeting followed by either a vertical or rotary cutter or by a rotary molder. Suitable die and cutter shapes are those which result in biscuit products having bone, round, square, triangular, T-bone or chop shapes and the like. The forming is achieved at conventional temperatures of ambient to about 45° C. and pressures of less than about 5½ kg/cm$^2$, used with a rotary molder, a vertical cutter or rotary cutter.

The dough pieces can be baked using any suitable or conventional equipment and conditions. For example, the dough pieces can be passed into a conventional oven where the biscuit is baked. The conveyer belts of the oven can be coated with an edible lubricant, such as a natural or synthetic cooking oil or shortening, to facilitate separation of the conveyer belts of the baked product. Temperatures in the range of about 100° C. to about 300° C. can be used. The baked biscuits can also be subjected to subsequent drying at temperatures of about 90° C. to 200° C. either within the baking oven or separately, to produce the desired moisture content in the final product. Baking and drying temperatures and times are those conventionally used in the production of a canine biscuit. Typically, baking temperatures and times for a hard, dry canine biscuit are about 100° C. to about 250° C. for about 25 minutes to about 8 minutes. Drying conditions for a hard, dry canine biscuit are typically about 90° C. to about 160° C. for about 25 minutes to about 12 minutes in a forced air dryer. On a weight basis, the moisture content of the final dry biscuit is preferably less than or equal to about 15 percent by weight and preferably about 10 to 12 percent by weight of the final biscuit at 70 percent relative humidity.

The baking and drying process provides a shelf stable product without the need of any moisture barrier protection.

The composition of the present invention is used to reduce oral malodour of pets, particularly dogs. For an average biscuit weight of 10 grams, a recommended biscuit intake is about 10 biscuits a day for a medium size dog, which should supply about ¼ to ⅓ of a dog's calorific requirement.

The invention will now be described with reference to the following examples. It will be appreciated that what follows is by way of example only and that modification of detail may be made without departing from the scope of the invention.

EXAMPLES

Example 1
VSC Reduction

The following types of dog biscuit were prepared according to conventional techniques:
1. A plain biscuit
2. A plain biscuit +0.1% eucalyptus oil
3. A plain biscuit +0.05% copper chlorophyllin
4. A plain biscuit +0.18% zinc sulphate The eucalyptus oil and the copper chlorophyllin were added into the biscuit dough prior to forming and baking. The biscuit dough comprised the following ingredients:

| Ingredient | % |
|---|---|
| Ground Wheat | 30% |
| Oats & Bran | 17.5% |
| Grits & Seeds | 16.5% |
| Gluten | 7.5% |
| Sugar | 6% |
| Fat | 5% |
| Aromas, Flavours | 7.5% |
| Vitamins & Minerals | 10% |

The level of eucalyptus oil in the final product was 0.02% (i.e. 200 ppm), with a large amount being lost in baking due to the volatility of the oil. The zinc sulphate was applied to the surface of the biscuit after baking, as a 30% solution in water.

The biscuits were fed to a panel of 16 small and medium sized dogs, with 1 biscuit per feeding being offered to dogs <10 kg in weight and 2 biscuits per feeding to those >10 kg in weight. VSC measurements were carried out immediately prior to feeding the biscuit(s), and 10 minutes, 30 minutes and 3 hours after feeding.

Measurement of VSCs was performed using a portable sulphide monitor (Halimeter, Interscan Co.). This instrument contains an electrochemical gas detector with a diffusion medium through which the air sample passes at a constant flow rate. The adsorption of VSC on an electrocatalytic sensing electrode generates an electric current directly proportional to the gas concentration which is then displayed in parts per billion (ppb). The inlet of the Halimeter was connected to a 30 cm length of teflon tubing. This was attached to a modified disposable syringe barrel (1 ml) which had a tear tip and finger tabs removed. The syringe barrel was replaced with a clean one for each dog to prevent saliva contamination of the tubing. To sample the oral cavity the syringe barrel was placed between the dog's incisors to a depth of 2–3 cm, depending on the size of dog. The dog's mouth and lips were held closed on the syringe to prevent licking and panting. A single measurement was taken and the VSC level (ppb) recorded when the reading on the Halimeter peaked, usually after about 15–20 seconds.

Table 1 shows the average change in VSC levels (% change), relative to this initial level, at the stated time intervals after feeding the biscuits.

TABLE 1

| Biscuit | 10 mins | 30 mins | 180 mins |
|---|---|---|---|
| 1 | −1.6 | −0.5 | −0.9 |
| 2 | −9.2 | −14.4 | −9.1 |
| 3 | −8.1 | −13.7 | −3.6 |
| 4 | −5.8 | −11.0 | −7.9 |

Analysis of variance was used to determine the effect of the biscuit composition on VSC levels. It can be seen that all of the biscuits containing active ingredients produce a greater reduction in VSC levels than a plain (active-free) biscuit. However, the only result which is significantly different from the plain biscuit is biscuit 2 (containing eucalyptus oil as the active ingredient), for which a 97% significance (p=0.03) is attained 30 minutes after feeding.

Example 2
Anti-bacterial Effect of Eucalyptus Oil Against Specific Bacteria

Four anaerobic bacteria, commonly associated with the generation of bad breath in humans, and believed to be associated with bad breath in domestic animals, especially dogs, were incubated with eucalyptus oil for 24 hours (*P. canoris*) or 48 hours (all other bacteria) at 37° C. prior to plating out. The anti-bacterial effect of eucalyptus oil is evident from Table 2 which shows the susceptibility of the bacteria to the oil. The data represent the $\log_{10}$(Total Viable Count (TVC)) of the bacteria obtained after incubation. The TVC enumerations of these cultures indicate that Eucalyptus oil has a significant detrimental effect on bacterial growth.

TABLE 2

| | ppm of Eucalyptus oil | | | |
|---|---|---|---|---|
| Organism | 20 | 200 | 2000 | 20000 |
| Porphyromonas canoris | 8.41 | 8.49 | 8.7 | 3 |
| Veillonella alcalescens | 7.89 | 7.81 | 7.9 | 3.66 |
| Bacteriodes oralis | 6.99 | 7.04 | 7.18 | 6.28 |
| Fusobacterium nucleatum | 7.23 | 7.23 | 7.04 | — |

Example 3
Anti-bacterial Effect of Various Essential Oils Against Bacteria in Canine Saliva Samples The potential antibacterial activity of a variety of commercially available essential oils against oral bacteria in canine saliva samples was determined. Fresh (zero h control) and stagnated saliva (24 h incubation period) samples were examined, since work by Sulser, G. F. et al., (1940, Journal of Dental Research, 19, 1736), Prinz, H. (1930, Dental Cosmos 72, 700) and McNamara, T. F. et al., (1972, Oral Surgery 34, 41) has demonstrated that a major source of offensive breath odour is saliva stagnation. In the present experiments, saliva stagnation and putrefaction was optimised by incubation for 24 h at 37° C.

Saliva from four Irish Setters was collected in sterile universal bottles (morning collection prior to feeding), and pooled before being used within 2 h of sampling. The saliva was diluted 1:10 in Maximum Recovery Diluent (Merck) and duplicate aliquots placed in bijou bottles. The chosen undiluted essential oil was added (filter sterilised, 0.2 $\mu$m Whatman filter) to produce a final oil concentration of 10000 parts per million of essential oil in each saliva sample. The tubes were mixed thoroughly. The samples were incubated at 37° C. for 24 h anaerobically. The control samples contained either (1) 2.0 ml fresh canine saliva with no added oil; or (2) 0.2 ml olive oil in place of essential oil.

For investigation of antimicrobial effects, 1 ml samples were removed at zero h and 24 h. A dilution series was prepared in Maximum Recovery Diluent and the appropriate dilution plated out onto pre-reduced Wilkins Chalgren agar. Plates were incubated anaerobically (Willins Chalgren agar, anaerobic jar) at 37° C. for 24 h. Total viable anaerobic counts were read after this time.

The results of the tests are shown in Table 3. Lemongrass, bay, cinnamon, clove and thyme oils all exhibited a strong antibacterial effect. Lavender, tea tree and rosewood oils showed a slightly milder anti-bacterial effect. The other oils mentioned in Table 3 all showed a statistically significant anti-bacterial effect in relation to the 24 hour control sample.

TABLE 3

Zero hour and 24 hour readings

| Sample | Colony Count $Log_{10}$ ml $Saliva^{-1}$ |
|---|---|
| Zero h readings | |
| No added oil | 7.1 |
| 24 h readings | |
| No added oil | 9.9 |
| Olive | 9.3 |
| Bay | 2.0 |
| Cinnamon leaf | 2.0 |
| Clove bud | 2.0 |
| Coriander | 8.0 |
| Cumin | 8.0 |
| Dill weed | 7.7 |
| Eucalyptus | 8.7 |
| Lavender | 3.8 |
| Lemongrass | <1.0 |
| Rosewood | 6.3 |
| Tea tree | 5.4 |
| Thyme (red) | 2.9 |

What is claimed is:

1. A breath-freshening dry or semi-moist pet food composition comprising at least 40 ppm by weight of one or more plant extract(s) selected from a group consisting of essential oil(s), oleoresin(s), absolute(s) and fruit juice(s), wherein the plant extract(s) is/are added to the pet food composition before the pet food composition undergoes a heating step.

2. A pet food composition according to claim 1 which is a pet biscuit.

3. A pet food composition according to claim 1, wherein the plant extract(s) is/are the sole active ingredient.

4. A pet food composition according to claim 1, comprising at least 80 ppm by weight of plant extract(s).

5. A pet food composition according to claim 1, comprising at least 120 ppm by weight of plant extract(s).

6. A pet food composition according to claim 1, comprising at least 200 ppm by weight of plant extract(s).

7. A pet food composition according to claim 1, comprising no more than about 800 ppm weight of plant extract(s).

8. A pet food composition according to claim 1, comprising no more than about 500 ppm weight of plant extract(s).

9. A pet food composition according to claim 1, comprising no more than about 200 ppm weight of plant extract(s).

10. A pet food composition according to claim 1 wherein there is one plant extract present.

11. A pet food composition according to claim 1 wherein said plant extract(s) are selected from essential oil(s).

12. A pet food composition according to claim 11 wherein the essential oil(s) is/are selected from a group consisting of eucalyptus oil, lemongrass oil, bay oil, cinnamon oil, lavender oil, thyme oil, clove bud oil and teatree oil.

13. A pet food composition according to claim 11 wherein the essential oil is eucalyptus oil.

14. A pet food composition according to claim 11 wherein the essential oil is lemongrass oil.

15. A pet food composition according to claim 1 which is a dog or cat food.

16. A process of manufacturing a dry or semi-moist pet food composition for reducing oral malodour in a domestic animal comprising the steps of:

providing a pet food composition, wherein the pet food composition is a conventional dry or semi-moist pet food composition;

adding one or more plant extract(s), wherein the plant extract(s) is/are present in an amount of at least 40 ppm by weight and wherein the plant extract(s) is/are selected from a group consisting of essential oil(s), oleoresin(s), absolute(s) and fruit juice(s); and heating the pet food composition.

17. A process according to claim 16 wherein the pet food composition is a pet food composition according to claim 1.

18. A method of reducing oral malodour in a domestic animal by administration to, or the consumption by, the animal in need thereof of a dry or semi-moist pet food composition according to claim 1.

* * * * *